Dec. 17, 1929.　　　W. A. DOREY　　　1,740,229
LIGHTING APPARATUS
Filed Jan. 24, 1928　　　4 Sheets-Sheet 1
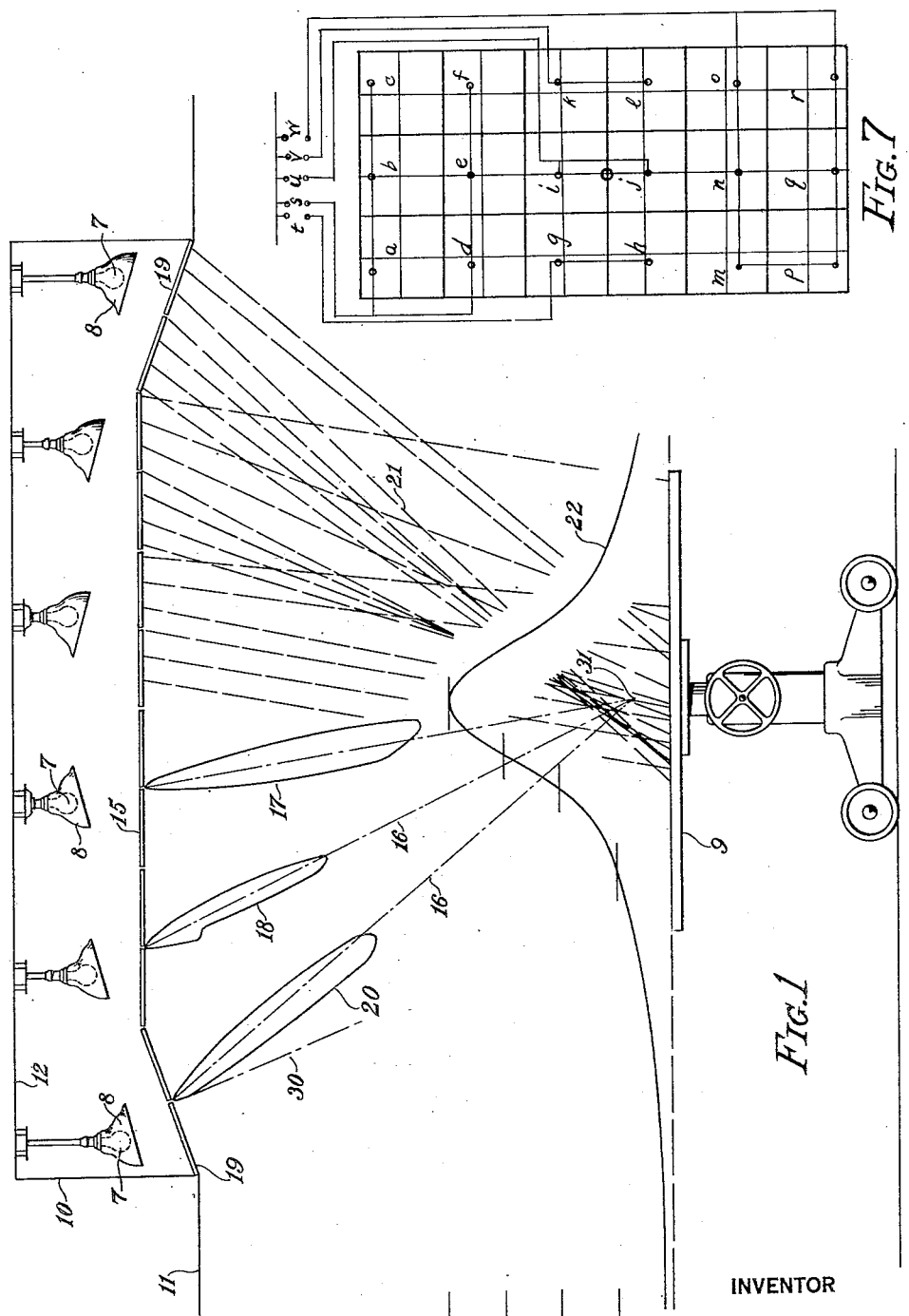

Dec. 17, 1929.   W. A. DOREY   1,740,229
LIGHTING APPARATUS
Filed Jan. 24, 1928    4 Sheets-Sheet 2
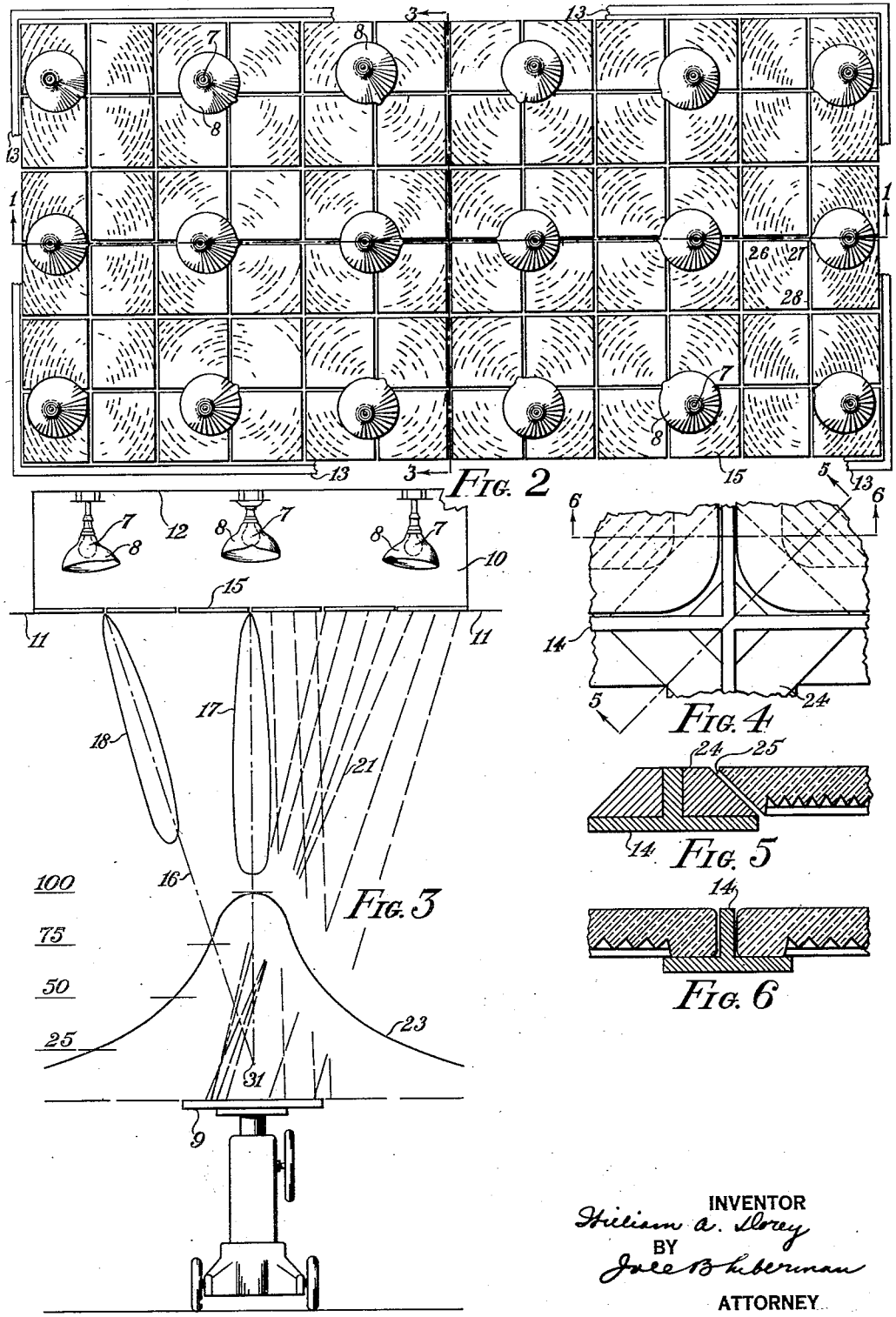

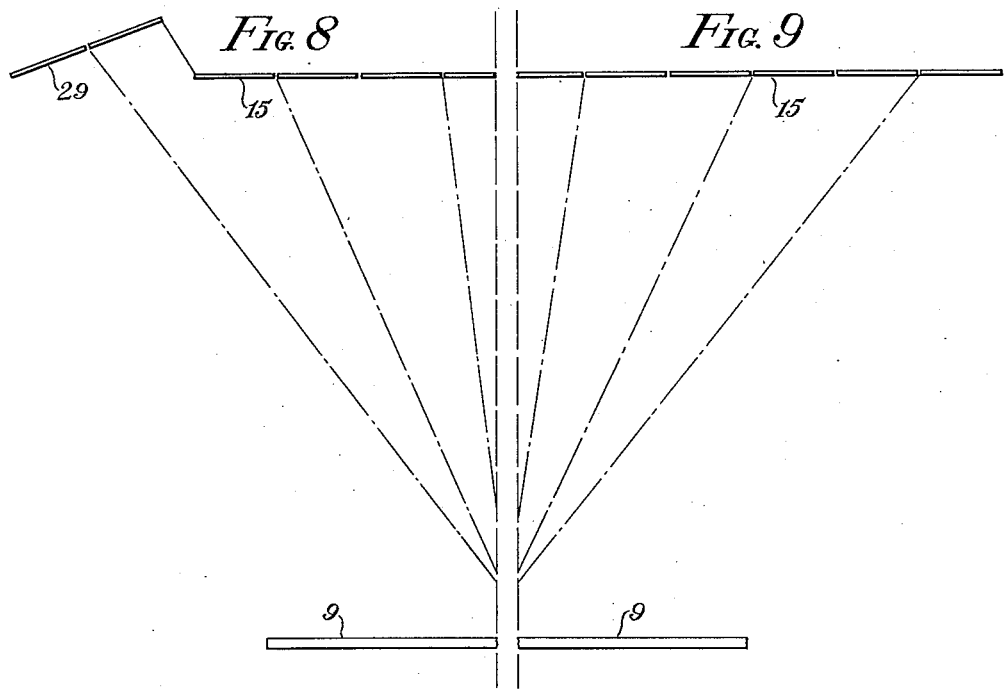
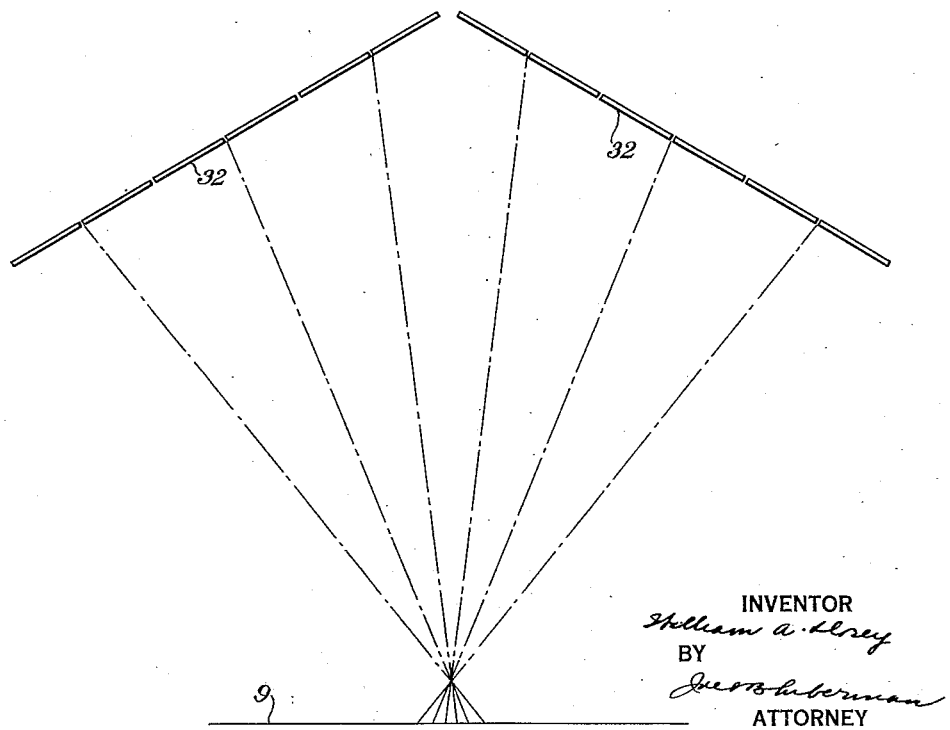

Dec. 17, 1929.    W. A. DOREY    1,740,229
LIGHTING APPARATUS
Filed Jan. 24, 1928    4 Sheets-Sheet 4
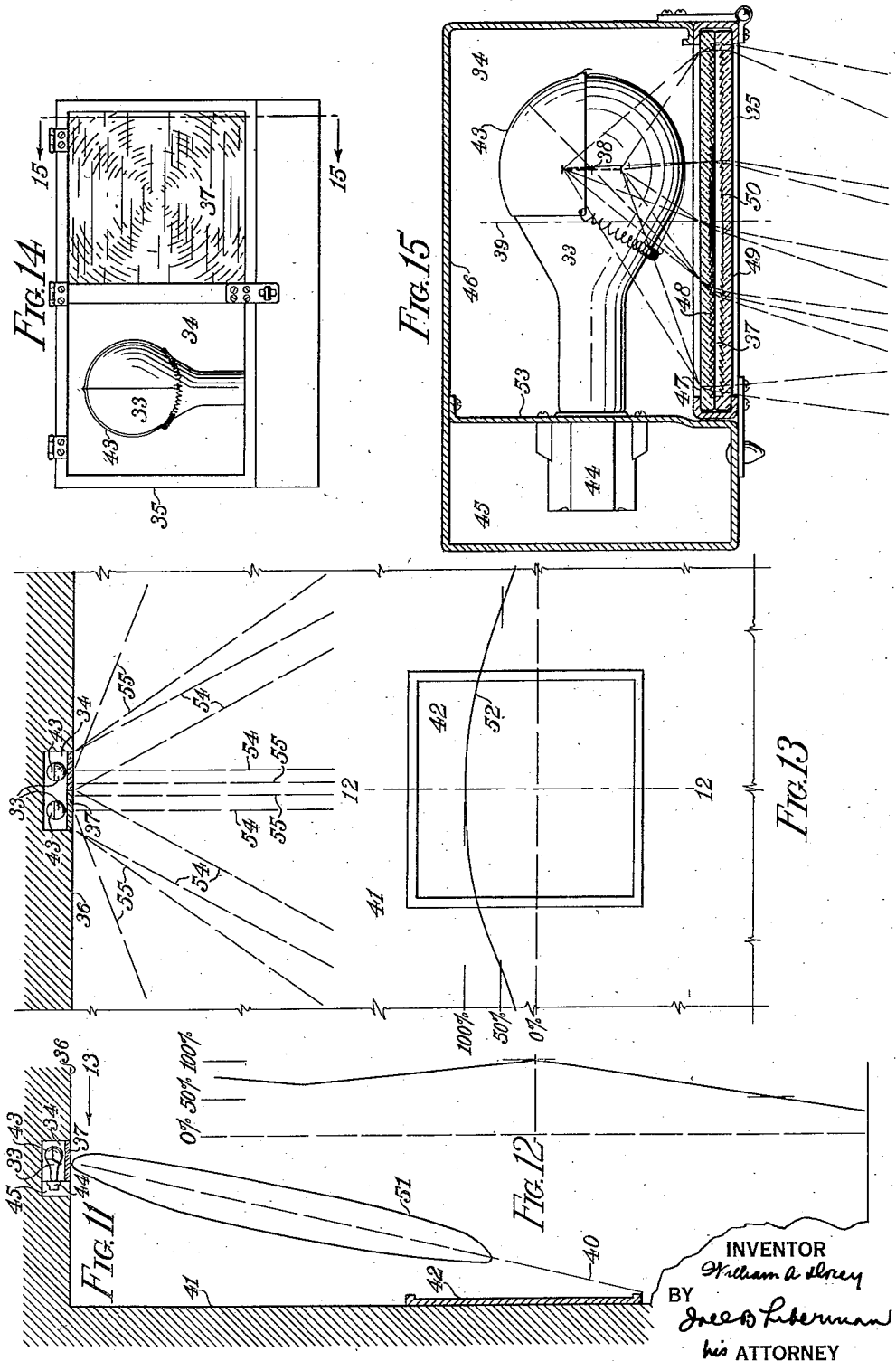
INVENTOR
William A. Dorey
BY
Joel B. Liberman
his ATTORNEY Patented Dec. 17, 1929

1,740,229

UNITED STATES PATENT OFFICE

WILLIAM A. DOREY, OF NEWARK, OHIO, ASSIGNOR TO HOLOPHANE COMPANY, INC., OF NEW YORK, N. Y., A CORPORATION OF NEW YORK

LIGHTING APPARATUS

Application filed January 24, 1928. Serial No. 248,994.

In its more general aspects, the present invention relates to lighting apparatus characterized by the employment of a shallow recess, compartment, or the like, preferably having a diffuse reflecting surface and housing a plurality of individual light directing units each comprising a light source, such as an incandescent lamp, a lens, and preferably a specular reflector cooperating directly with the lens. The lenses may form a continuous cover or bottom, as well as provide a virtual light source of comparatively large area. The inner space is preferably left open between the individual units so that stray light from the sources, specular reflectors and diffuse reflecting lining of the recess may reach the lenses and be diffusely transmitted by them with minimum obstruction.

One of the principal objects of this invention is to provide a lighting apparatus of large area to produce illumination of high intensity in a relatively small space, preferably combined with a moderate illumination over a large surrounding area. Such an apparatus combines the advantages of spot lighting and a system of general illumination and is peculiarly adapted, without other accessory lighting, to the illumination of operating rooms and the operating table itself, to shop windows, shop interiors, or inspection tables, blackboards or any place where the above mentioned requirements of illumination are desired.

In designing a lighting apparatus for hospital operating rooms, I accomplish this object by utilizing an artificial skylight backed by a compartment or recess sufficient to house a number of light sources provided with individual reflectors and having a white diffuse reflecting lining, and completely filling the skylight frame itself with individual collecting lenses cooperating mainly with the individual light sources. The lenses and light sources are arranged in such a relation as to converge the various beams of transmitted light upon the desired space, which, in the case of an operating room, is the center of the operating table and directly underneath the center of the apparatus. The lighting units are arranged symmetrically above the center of the operating table and connected to switches so that they may be selectively controlled.

The accompanying drawings show, for purposes of illustrating the invention several arrangements suitable for operating room lighting, and an arrangement suitable for blackboard lighting. It is understood that the drawings are illustrative of the invention rather than limiting the same.

In these drawings:

Figure 1 is a vertical longitudinal section through one form of lighting apparatus for operating rooms and showing the light beams and light intensity curve in relation to the operating table;

Figure 2 is a plan view of the lighting apparatus;

Figure 3 is a transverse cross section of the lighting apparatus and operating room;

Figure 4 is a large scale view of one of the mullion intersections in the lens supporting frame;

Figures 5 and 6 are vertical cross sections on the lines 5—5 and 6—6 of Figure 4;

Figure 7 is a diagrammatic plan view of a lens plate system and switching system for controlling the lamps;

Figures 8, 9 and 10 are diagrams showing modified lens arrangements of lighting systems for operating rooms;

Figure 11 is a vertical transverse cross section of a portion of a room containing a blackboard and lighting system for the same;

Figure 12 is a diagram showing the illumination of the blackboard surface in the plane 12—12 of Figure 13;

Figure 13 is a vertical longitudinal view at right angles to Figure 11 showing the lighting system in cross section and the blackboard in elevation;

Figure 14 is an inverted plan view of the lighting system showing one lens in place and one lens removed; and Figure 15 is a vertical sectional view of one unit of this lighting system in the plane 15—15 of Figure 14.

In the past, operating rooms have been lighted in two radically different ways. In some cases the operating area on the patient has been especially spot lighted, in other cases the operating room has been flooded with a fairly high uniform general illumination. When the spot lighting method is used the field of the wound is very well illuminated but vision is difficult when the attention is transferred from that field and this causes eye adaptation troubles. In addition there is a deficiency in either vertical or horizontal illumination depending upon the angle from which the light spot is cast. One result of this also is insufficient diffusion and probable trouble due to shadows.

When a high degree of general illumination is used, the field about the wound (which is the most important), is inadequately illuminated, and almost invariably auxiliary lights will be added to help boost the local illumination to compensate for the greater light absorption of the open wound. The cost of operation and maintenance is very high, and the vertical illumination is apt to be deficient. This difficulty is overcome in the invention by creation of a field of relatively high intensity below the center of the apparatus and a moderate illumination over surrounding areas.

In Figures 1, 2 and 3 the details of the optical arrangements are set out, the light sources 7 being equipped with translucent specular reflectors 8 which are preferably spherical or ellipsoidal in contour and have their axes at an angle with the vertical and inclined toward the operating table 9 which is preferably located under the center of the complete lighting system. These light sources are enclosed by a chamber 10 recessed above the ceiling line 11. The interior surface 12 of this chamber is preferably finished with a matte white surface such as white paint or asbestos board. 13 is a skylight frame (shown broken away at the lower corners) having lens sections 15 supported by mullions 14 arranged in squares as shown enlarged in Figures 4, 5 and 6 As here shown, each one of the lens sections 15 is designed to be a quarter of a complete condensing lens of the Fresnel type. Each of the light sources 7 is arranged to cooperate with one full four-section lens, as indicated in Figure 2. One piece lenses may be used, if desired. The light sources are offset from the lens centers in varying degrees as indicated so that the axes of the beams from the lenses will be directed toward a small space 31 directly above the center of the operating table 9.

In Figures 1 to 4 and 7, the individual light directing units are arranged in longitudinal and transverse rows in the recess or compartment. The particular arrangement shown is convenient, but is merely illustrative. For operating room lighting it is preferable, so far as possible, to have the apparatus symmetrical about a center above the operating table so that the predominant rays from the units may be all converged from all sides onto the wound.

In Figure 7, the units are designated by the letters a . . . r, inclusive, small circles indicating the location of the lamps. The center of the system is indicated by a circle —O—. A suitable switching arrangement is indicated. The lamps for units a, b, c, d, e and f are connected together and wired to a switch s; the lamps g and h are connected to a switch t, the lamps i, and j are connected to a switch u, the lamps k and l are connected to a switch v, the lamps m, n, o, p, q and r are connected to a switch w. Such a switching arrangement permits selective control of the lighting units in banks and adjustment of the intensity and direction of the light rays, with attendant advantages.

In Figures 4, 5 and 6 enlarged sections of mechanical details are shown, Figure 4 being a plan view showing the intersection of mullions at the exterior of four neighboring lenses with two of the lenses in place. Figure 5 is a diagonal cross section on line 5—5 through the intersection of the mullions. Figure 6 is a cross section of Figure 4 on line 6—6 showing the general form of the mullion and the flanges. In these figures 14 is the mullion, 24 being a slug fastened in the mullion at its intersections and 25 is a beveled corner of the lens flange fitting against the slug 24.

Referring to Figure 2, the interior corners of each lens section 26, 27, 28 are not beveled nor are the corresponding mullion intersections supplied with slugs. It is therefore impossible to seat the lens sections in the frame in any other than the proper position.

In Figures 1 and 3 the beams of light have been indicated diagrammatically in their relation to the working plane, with a view to tracing the course of the main light rays emitted by the lenses. These rays proceed directly from the respective light sources to their corresponding lenses and are converged as shown upon the space 31 immediately above the center of the operating table 9.

In these figures, the axes of various beams are indicated diagrammatically at 16. 17 is a diagrammatic representation of the distribution of intensity from the lenses near the center of the skylight. 18 shows the distribution of intensity from the lenses moderately offset from the center of the system.

It will be noted that with an increase of degree of offsetting, the intensity obtainable along the beam axis is diminished. On this account I prefer to tilt the extreme end lenses 19 as shown in Figure 1, so that their normal axes are inclined part way toward the center of the system. It is then possible to get the additional throw required by offsetting the light source from the normal lens axis so as to direct the axis of the beam to the space above the center of the operating table without undue loss in intensity. 20 shows the distribution of intensity from these tilted lenses.

The light rays coming from the translucent reflectors 7 act to reinforce these main beams, soften their edges, and contribute slightly to a general illumination of the room.

It is of great advantage to keep the space between the light sources entirely free of obstructions because a considerable portion of the direct light from the sources which is not intercepted by the reflectors, falls upon adjacent lenses and is transmitted in directions useful for general illumination of the room. Light reflected back from the interior surface of the lenses and light transmitted by the translucent reflectors 8 will in part be reflected by the interior surface 12 of the chamber 10 in such direction as to be usefully transmitted by the lenses for general illumination of the room.

22, Figure 1, and 23, Figure 3, are typical curves of horizontal illumination at the level of the operating table produced by the combined action on the light sources of the lenses, reflectors, and diffuse reflecting interior of the chamber. The intensity at each side of the table is 50% of that at the center. The intensity at the end of the table is about 20% of that at the center of the table and the intensity beyond the edge of the skylight runs down to about 5% of that at the center of the table.

Figure 8 shows a modification of the skylight arrangement shown in Figure 1, the arrangement of lenses 15 being the same but the extreme outer lens element 29 is tilted upward from the main line of the skylight frame. This modification will produce a skylight frame of simpler construction than that shown in Figure 1 and its operation is entirely similar.

Figure 9 shows a skylight arrangement in which the extreme end lenses are not tilted, only the horizontal construction 15 being used. Such a form as this will be used in some cases where architectural limitations make the tilting of the end lenses inadvisable.

Fig. 10 shows a skylight arrangement in which the whole frame is divided into two flat sections 32 both of which are tilted. This is a very desirable arrangement in places where the length of the skylight opening is proportionately short.

The lenses used may be of any type which gathers together the divergent rays from the source and concentrates them into a narrow divergent or convergent cone or beam. I prefer, however, to use a plano convex type in which the plane side faces the light source and the convex side is broken up into concentric corrugations so that they may be made up in flat, square plates. If the light source be placed in the axis normal to the center of the lens, the beam of light emitted by the lens will be symmetrical with respect to this axis. If the light source be offset to the right of this axis, the emitted beam will be offset to the left of this axis and the greater the degree of offset of the light source, the greater the degree of offset of the beam. In my apparatus I offset the light sources from their respective lens axes in varying degree so that the resulting emitted beams are in each case offset to the proper degree to reach the small space where a relatively high degree of illumination is required. In lighting a wound we are not interested solely in lighting horizontal surfaces but wish to get universal lighting over surfaces of varying inclinations. This is accomplished by making the combined light source of large area so that the beams from the extreme outer plate are directed at a considerable angle and thus give a high illumination to inclined or vertical surfaces.

By combining a number of sources in one large recess I am able to make more efficient use of that portion of the emitted light from each source which is not directly intercepted by its corresponding lens, for this stray light will, in large part be caught up by neighboring lenses and emitted in directions useful for producing general illumination in the room. In addition to this the one large recess will be very shallow in proportion to its width, which gives a favorable condition for diffuse reflection from the surface of the recess back through the lenses to increase the general illumination in the room. While I have shown and described individual translucent reflectors used with the individual light source, it is also contemplated that the same system can be employed using metal or mirrored reflectors together with the other elements shown and described.

In the description the adaptation of the system to hospital lighting has been emphasized but it should be understood that it can apply to any lighting system where general illumination over a large area is desired with intense illumination over a limited area, for instance in shop windows, shop interiors, or over inspection tables. It will often be desirable that the high point in the illumination should be directed from one dominant direction. This can be easily accomplished in my apparatus by having separate switching control for the lamps so that any combination of lamps can be used in order to produce the desired dominant direction.

The most usual method for obtaining the advantages of a virtual light source of comparatively large area is to direct the light from the original sources upon a large ceiling area which in turn diffusely reflects the light to the working plane. When such ceiling areas are the main virtual source of the lighting there will be a perceptible change in the color of the light. In my apparatus the larger portion of the light is transmitted directly through a crystal glass which has very little selective absorption and the color of the light is therefore changed very little.

Figures 11, 12, 13, 14 and 15 show a modification of my invention adapted to lighting vertical surfaces such as blackboards, maps, photograph racks, book cases and bulletin boards. A number of light sources 33 are mounted in a single recess 34 covered by a horizontal hinged sash 35 preferably flush with the ceiling line 36. The sash 35 supports flat lens combinations 37 below each of the light sources 33. Referring especially to Figure 15, the center of the light source 38 is offset from the axis of the lens combination 39 so that the axis of the transmitted beam 40 of Figure 11 will be inclined toward the wall 41 supporting the blackboard 42. Each light source is provided with a spherical reflector 43 including that angle of the emitted upward light which can be reflected back to the particular lens cooperating with that particular light source. The lamp sockets 44 are supported by one wall of the recess and are inclosed in a wiring channel 45. The interior surface of the recess 46 has in general a white matte diffuse reflecting surface so that direct light from the source and reflected light from the lenses which strike the surface will be diffusely reflected and finally in great part be transmitted by the lenses to reinforce the specific illumination of the blackboard and furnish some general illumination to surrounding areas.

It is desirable that the light rays should strike the blackboard in a very slanting direction so that any specular reflection from its surface will pass well below eye level. This necessitates placing the lighting system close to the wall and the angle subtended by the blackboard in the normal vertical plane is therefore small and is smaller for a unit vertical distance at the bottom of the blackboard than at the top of the blackboard. Therefore in order to get a reasonable uniformity of illumination on the blackboard it is necessary to have a concentrated beam in planes perpendicular to the blackboard and in practice it is found desirable to aim the beam well below the lower edge of the board. In lateral directions it is permissible and desirable to have a somewhat spread beam and beams overlapping from adjacent light sources which tend to smooth out the illumination by eliminating striations due the size and irregular shape of ordinary commercial lamp filaments, and other variations in the lighting system.

In order to provide the general type of distribution required for the blackboard itself I prefer to use the lens combination 37 of Figure 15 consisting of an inner plate 47 having concentric prisms 48 arranged about the axis 39 and adapted to transmit the direct light received by it in a comparatively wide beam and an outer plate 49 having parallel prisms 50 which are set parallel with the blackboard and are adapted to concentrate the beam from plate 47 in plane normal to the blackboard and to transmit the beam unmodified in lateral planes. The course of typical light rays is shown in Figure 15. The lateral spread of light rays is materially assisted by light emitted directly from the source to the adjacent lens or lenses. The course of typical emitted light rays is shown in Figure 13. Emitted light rays 54 are those originating at the light source immediately above the lens and light rays 55 are those originating at the adjacent light source. Therefore the distribution indicated by light rays 54 is that which is due to the action of individual units and the distribution indicated by light rays 55 is that due to the interaction between neighboring units. 51 in Figure 11 is a diagram of the distribution of intensity from the lighting system in the plane 12—12 of Figure 13. Figure 12 is a diagram showing the illumination produced on the blackboard surface in the vertical line 12—12 of Figure 13. 52 in Figure 13 is a diagram showing the illumination produced on the blackboard surface in a horizontal line through the center of the blackboard. It should be noted that the illumination at the extreme top and bottom edges is 80% of that at the center and that the illumination at the extreme side edges is 87% of that at the center. This is a very good degree of uniformity.

Light diffusely reflected by the surface of the recess 46 and transmitted by the lenses produce a soft bright luminosity of the plate at any angle of view, thus reducing the contrast of small bright areas of the plate surface produced by transmission of direct light. The diffusely reflected light gives a low illumination throughout the room. If the ceiling is comparatively low and the light sources very close to the wall, the illumination on the wall above the blackboard may be made altogether too high. In such cases the rear wall of the recess 53 of Figure 15 may be finished black and the other surfaces left white to good advantage. This will reduce the illumination on the upper walls materially with a negligible loss of illumination in other regions.

The symmetrical arrangement of light directing units as particularly set forth for lighting operating rooms is not essential where the lighting apparatus is to be used for certain other purposes such as window lighting, blackboard lighting and the like wherein all the light is required from an apparatus above and in front of the object to be lighted. In such cases the plate system may approximate that of one end of the operating room system. The spacing of the light sources may be changed to vary or adjust the light pattern.

I claim:

1. A lighting apparatus comprising a group of light collecting lenses and light sources disposed above the lenses for producing illumination of high intensity below the center of the apparatus and a moderate degree of illumination on surrounding areas, each of the light sources being off-set from the axis of the corresponding lens so that the beams emitted from the lenses overlap the space to be illuminated.

2. A lighting apparatus of relatively large area and comprising a group of light collecting lenses with their axes non-convergent on said space, and light sources disposed above the lenses for producing illumination of high intensity at a relatively small space below the center of the apparatus and moderate illumination over surrounding areas, each of the light sources being off-set from the axis of the corresponding lens so that the beams emitted from the lenses overlap the space to be illuminated.

3. A lighting system for producing illumination of a predetermined pattern, comprising a shallow compartment housing a plurality of individual light directing units each consisting of a lens, a light source offset from the axis of the lens, and a specular reflector about the light source for redirecting the light onto the lens, the beam of light from each of said light directing units being of a predetermined form to fall within said pattern, the lenses forming a cover for the compartment and providing a virtual light source of comparatively large area, the inner space being left open between the individual units, and being lined with diffuse reflecting means so that stray light from the lining, reflector and direct from the light sources may reach the lenses and be diffusely transmitted by them.

4. A lighting system for producing illumination of high intensity and a predetermined pattern, comprising a shallow compartment housing a plurality of individual light directing units each consisting of a lens, a light source offset from the axis of the lens, and a specular reflector about the light source and having its optical axis inclined towards the center of the lens, the beam of light from each of said light directing units being oblique to the axis of the lens and in a predetermined relation to fall within said pattern, the lenses forming a cover for the compartment and providing a virtual light source of comparatively large area, the inner space being left open between the individual units, and being lined with diffuse reflecting means so that stray light from the lining, reflector and direct from the light sources may reach the lenses and be diffusely transmitted by them.

5. A lighting system for producing illumination of high intensity over a relatively small area and moderate illumination over surrounding areas, comprising a shallow compartment housing a plurality of individual light directing units each consisting of a lens, a light source and a specular reflector about the light source for redirecting the light onto the lens, the beam of light from each of said light directing units being oblique to the axis of the lens and falling upon the relatively small area, the lenses forming a cover for the compartment and providing a virtual light source of comparatively large area, the inner space being left open between the individual units, and being lined with diffuse reflecting means so that stray light from the lining, reflector and direct from the light sources may reach the lenses and be diffusely transmitted by them to illuminate the surrounding areas and increase the illumination of the small area.

6. A lighting system for producing illumination of high intensity over a relatively small area and moderate illumination over surrounding areas, comprising a shallow compartment housing a plurality of individual light directing units each consisting of a lens, a light source offset from the axis of the lens, and a specular reflector about the light source and having its optical axis inclined toward the center of the lens, the beam of light from each of said light directing units being oblique to the axis of the lens and falling upon the relatively small area, the lenses forming a cover for the compartment and providing a virtual light source of comparatively large area, the inner space being left open between the individual units, and being lined with diffuse reflecting means so that stray light from the lining, reflector and direct from the light sources may reach the lenses and be diffusely transmitted by them to illuminate the surrounding areas and increase the illumination of the small area.

7. A lighting apparatus for producing illumination of high intensity and a predetermined pattern below the apparatus, comprising, a shallow compartment housing a plurality of individual light directing units each consisting of a lens, an electric lamp offset from the axis of the lens, a specular reflector, the units being arranged to one side of the relatively small area in longitudinal and transverse rows with the lenses forming a cover and providing a virtual light source of comparatively large area, the beam of light from each of said light directing units being oblique to the axis of the lens and in a predetermined relation to fall within said pattern, and switches for selectively controlling the lighting units to be lighted whereby the incident angle of the predominating light rays may be varied.

8. A lighting apparatus for producing illumination of high intensity and a predetermined pattern below the center of the apparatus, comprising, a shallow compartment housing a plurality of individual light directing units each consisting of a lens, an electric lamp offset from the axis of the lens, a specular reflector, the units being arranged symmetrically about the center of the apparatus in longitudinal and transverse rows with the lenses forming a cover and providing a virtual light source of comparatively large area, the beam of light from each of said light directing units being oblique to the axis of the lens and in predetermined relation to fall within said pattern, and switches for selectively controlling the lighting units to be lighted whereby the incident angle of the predominating light rays may be varied.

9. A lighting apparatus for producing illumination of high intensity over a relatively small area below the apparatus and moderate illumination over surrounding areas, comprising, a shallow compartment housing a plurality of individual light directing units each consisting of a lens, a specular reflector, the units being arranged above and offset from the relatively small area in longitudinal and transverse rows with the lenses forming a cover and providing a virtual light source of comparatively large area, the beam of light from each of said light directing units being oblique to the axis of the lens and falling on said relatively small area, the inner space being left open between the individual units, diffuse reflecting means for intercepting the stray light and returning it to the lenses to be diffusely transmitted by them to illuminate the surrounding areas, and switches for selectively controlling the lighting units to be lighted whereby the incident angle of the predominating light rays may be varied.

10. A lighting apparatus for producing illumination of high intensity over a relatively small area below the center of the apparatus and moderate illumination over surrounding areas, comprising, a shallow compartment housing a plurality of individual light directing units each consisting of a lens, an electric lamp offset from the axis of the lens, a specular reflector, the units being arranged symmetrically about the center of the apparatus in longitudinal and transverse rows the lenses forming a cover and providing a virtual light source of comparatively large area, the beam of light from each of said light directing units being oblique to the axis of the lens and falling on said relatively small area, the inner space being left open between the individual units, diffuse reflecting means for intercepting the stray light and returning it to the lenses to be diffusely transmitted by them to illuminate the surrounding areas, and switches for selectively controlling the lighting units to be lighted whereby the incident angle of the predominating light rays may be varied.

11. A lighting apparatus for producing illumination of high intensity in a small area below the apparatus and a moderate illumination over surrounding areas, comprising a group of light collecting lenses above and offset from the small area and light sources disposed above the lenses, the light sources being offset from the axis of the corresponding lenses so that the beams emitted from the lenses fall on the small area to be illuminated.

12. A lighting apparatus for producing a definite light pattern of high intensity on a plane of predetermined area, comprising, a group of light collecting lenses having axes nonconvergent on said area, and illuminating means on the opposite side of the lenses adjacent the lens axes but sufficiently offset therefrom to produce emitted beams which fall on the area to be illuminated.

Signed at Newark, in the county of Licking and State of Ohio, this 19th day of January, 1928.

WILLIAM A. DOREY.